US012784037B2

(12) United States Patent
Le-Huy et al.

(10) Patent No.: US 12,784,037 B2
(45) Date of Patent: Nov. 3, 2026

(54) SECURE DATA SHARING MANAGEMENT IN MULTI-PARTY COMPUTATION SYSTEMS

(71) Applicant: MPC Holding, Inc., New York, NY (US)

(72) Inventors: Cat-Tuong Le-Huy, London (GB); Miles Parry, Croydon (GB)

(73) Assignee: MPC Holding, Inc., New York, NY (US)

( * ) Notice: Subject to any disclaimer, the term of this patent is extended or adjusted under 35 U.S.C. 154(b) by 212 days.

(21) Appl. No.: 18/746,130

(22) Filed: Jun. 18, 2024

(65) Prior Publication Data

US 2024/0420125 A1 Dec. 19, 2024

Related U.S. Application Data

(60) Provisional application No. 63/509,014, filed on Jun. 19, 2023.

(51) Int. Cl.
*G06Q 20/38* (2012.01)

(52) U.S. Cl.
CPC ..... *G06Q 20/3825* (2013.01); *G06Q 20/3829* (2013.01)

(58) Field of Classification Search
CPC ...................... G06Q 20/3829; G06Q 20/3825
See application file for complete search history.

(56) References Cited

U.S. PATENT DOCUMENTS 10,211,977 B1 2/2019 Roth et al.
11,418,329 B1 8/2022 Miller
12,001,577 B1 6/2024 Xiong et al.
(Continued)

FOREIGN PATENT DOCUMENTS

EP 3576000 B1 * 8/2020 .............. H04L 9/50

OTHER PUBLICATIONS

Chen; Dynamic Improvement and Efficiency Optimization of Wireless Power Transfer Systems Using Improved FCS-MPC and P&O Methods; IEEE transactions on power electronics, Nov. 2023, vol. 38 (11), p. 1-17.*

(Continued)

*Primary Examiner* — Ilse I Immanuel
(74) *Attorney, Agent, or Firm* — Barnes & Thornburg LLP

(57) ABSTRACT

The disclosed technology provides for managing, authenticating, and authorizing data sharing between parties utilizing multi-party-computation ("MPC"). A method can include: receiving, by a server from a party B system, (i) a request to access first data of a party A system and (ii) second data of party B, sending, to the party systems, an authorization request to authorize the request, receiving, from the party systems, MPC shares associated with trusted third party processing of data, the MPC shares generated as part of a digital contract between the parties for combining the first and second data within an environment of the trusted third party, to which neither party has access, retrieving MPC authorization functions associated with the digital contract, determining whether the requested access is authorized based on the MPC shares and MPC authorization functions, and performing data processing operations using the first and second data in a secure environment.

20 Claims, 8 Drawing Sheets

(56) References Cited

U.S. PATENT DOCUMENTS

| | | | |
|---|---|---|---|
| 2012/0179905 | A1 | 7/2012 | Ackerly |
| 2013/0318347 | A1 | 11/2013 | Moffat |
| 2017/0222802 | A1 | 8/2017 | Rubin et al. |
| 2017/0244553 | A1 | 8/2017 | Savry et al. |
| 2018/0167203 | A1 | 6/2018 | Belenko |
| 2020/0042828 | A1 | 2/2020 | Mauricio et al. |
| 2020/0044863 | A1* | 2/2020 | Yadlin ..................... G06F 21/44 |
| 2020/0169388 | A1 | 5/2020 | Wei et al. |
| 2020/0204357 | A1 | 6/2020 | Seyfried et al. |
| 2020/0228313 | A1 | 7/2020 | Storm et al. |
| 2020/0265159 | A1 | 8/2020 | Schmatz et al. |
| 2020/0287874 | A1 | 9/2020 | Bertram et al. |
| 2021/0067344 | A1 | 3/2021 | Drake et al. |
| 2021/0273921 | A1 | 9/2021 | Kumar et al. |
| 2021/0397732 | A1 | 12/2021 | Muddle et al. |
| 2022/0092216 | A1 | 3/2022 | Mohassel et al. |
| 2022/0271914 | A1 | 8/2022 | Diallo et al. |
| 2023/0155989 | A1 | 5/2023 | Kumar et al. |
| 2024/0249289 | A1* | 7/2024 | Chiapuzio ............ G06Q 20/065 |

OTHER PUBLICATIONS

"What is Multiparty Computation?", IEEE Digital Privacy, (no publication date), accessed at https://digitalprivacy.ieee.org/publications/topics/what-is-multiparty-computation on Sep. 23, 2024, 4 pages.

"What is MPC (Multi-Party Computation)?", Fireblocks, (no publication date), accessed at https://www.fireblocks.com/what-is-mpc/ on Sep. 23, 2024, 9 pages.

International Search Report and Written Opinion in PCT/US2024/034423, dated Sep. 8, 2025, 8 pages.

* cited by examiner

SECURE DATA SHARING MANAGEMENT IN MULTI-PARTY COMPUTATION SYSTEMS

INCORPORATION BY REFERENCE

This application claims the priority benefit of U.S. Provisional Patent Application No. 63/509,014, filed Jun. 19, 2023, the entirety of which is incorporated herein by reference.

TECHNICAL FIELD

This document generally describes devices, systems, architectures, and methods related to multi-party computation ("MPC") technology that allows multiple parties to jointly and securely share data while maintaining sovereignty of the party's respective data.

BACKGROUND

Multi-party computation techniques can include cryptographic protocol for distributing a computation across multiple parties where no individual party may see other parties' data. MPC techniques can be used for performing secure transactions, such as cryptocurrency transactions, over networks, such as blockchains. A blockchain is a digitally distributed, decentralized, public ledger that can facility processes of recording transactions and tracking assets across a network.

SUMMARY

This document generally describes devices, systems, architectures, and methods related to MPC cryptographic technology that allows multiple parties to securely share data while maintaining sovereignty over the party's respective data. MPC technology can be used to secure all sides of a data sharing transaction. For example, two parties can interact with each other over an MPC bridge, where one party provides data and the other party provides machine learning models. The MPC technology described herein can provide temporary access through this architecture to get this data from one party and provide it as input to the machine learning model of the other party, thereby creating a secure and trusted wall effect between the two parties. The MPC technology can secure data of both parties so that the data can be used by the machine learning models in a secure environment to derive secondary business data or insights, and without exposing either the data or the machine learning models to the other party. Each of the parties can maintain sovereignty over their data and/or data processing techniques-meaning that each of the parties maintains propriety over their data and/or data processing techniques while still permitting for various operations and/or combinations of the parties' proprietary material to be performed.

As an illustrative example of implementation, third party data (e.g., at scale, it can be big data) can suffer from a trust issue because current data governance frameworks may not be sufficient to protect that third party data. Party A can have raw trade data (e.g., pharmaceuticals, defense, healthcare data, personally identifiable information or PII, gasoline volume data, gasoline price data, data from different vendors, or any other type of data) that has potential value. Party B may have data processing models (i.e., machine learning ("ML") models) that can potentially extract outcomes or commercial value by using the raw trade data. Party A may be afraid of data leakage and/or may be concerned that Party B may persistently store, share, or use the data in unintended ways-potentially nullifying the proprietary nature of Party A's data and thus may not authorize use of their data based on a lack of trust. Although party B may want to derive additional data by using party A's data as input to their models, party B also may not want to share their models with party A. The disclosed MPC technology, on the other hand, can enable cryptographically-assured authentication and authorization to party A's data for use in combination with party B's data processing models, while also enabling data governance controls between the parties. Using the disclosed MPC technology, party B can request access to party A's data using an MPC architecture. A digital contract can be created between the parties to allow each party to sign on requests by either party to use their data. Either of the parties may also rescind their signatures to pull back their data and stop their data from being used in the data processing that is performed, for example, in a secure enclave of the MPC architecture.

The disclosed MPC architecture can apply to many use cases and/or industries, including but not limited to cryptocurrency transactions, blockchain transactions, pharmaceutical data and trials, defense engineering, aerospace, other industries with contracts and subcontracts sharing data between parties, and other general data sharing activities.

MPC technology can rely on the joint and distributed computation of a function by multiple parties while keeping the inputs of those parties private, such as private keys or secrets, thereby allowing the multiple parties to securely share data between wallets. The disclosed technology provides an improved MPC architecture and process flow that permits for greater security and control over MPC transactions by establishing an access control system, such as a policy engine, that works in concert with various hardware security modules ("HSM") to provide policies that dictate the security conditions required for various data sharing transactions to be processed and authorized between contracting parties. Whereas MPC technology has been more challenging to administer, manage, and control, which could expose potential security vulnerabilities, the disclosed technology provides for more secure and granular control over MPC transactions, which can improve the overall security of data sharing techniques and provide inherent trust between the data sharing parties.

One or more embodiments described herein can include a method for managing, authenticating, and authorizing data sharing between multiple parties utilizing multi-party-computation ("MPC") techniques, the method including: receiving, by a server and from a party B system, (i) a request to access first data of a party A system and (ii) second data of the party B system, sending, by the server and to the party A system and the party B system, an authorization request to authorize the request to access the first data, receiving, by the server and from the party A system and the party B system, MPC shares associated with trusted third party processing of data from party A and party B, the MPC shares having been generated as part of a digital contract between party A and party B permitting for combining the first data and the second data within an environment of the trusted third party provided by the server, to which neither party A nor party B have access, retrieving, by the server, one or more MPC authorization functions associated with the digital contract, determining, by the server, whether the requested access to the first data and the second data is authorized based on the received MPC shares and the one or more MPC authorization functions associated with the digital contract, performing, by the server and based on a determination that the requested access is authorized, data processing operations using the first data and the second data in a secure environment, and returning, by the server, output from the data processing operations.

In some implementations, the embodiments described herein can optionally include one or more of the following features. For example, the MPC shares can be rescinded when one of the party A system and the party B system opt not to provide the respective first data or the second data. The data processing operations can be performed in a secure execution environment or secure enclave of the trusted third party provided by the server where the party A system provides the first data and the party B system provides the second data without the first and second data being exposed to the other party system. The data processing operations performed in the secure environment can be based on code that can be authorized and audited by the party A system and the party B system to restrict information that is outputted from the secure environment.

In some implementations, the MPC authorization functions can include a signing policy that includes (i) a designation of a transaction signing group, (ii) a designation of a group of transaction signing client devices that are included in the transaction signing group, and (iii) for each transaction class of a group of transaction classes, a corresponding threshold number of the group of transaction signing client devices that may be required to authorize a transaction request, the transaction request being a member of the transaction class. The transaction request can include a request to process the first data using the second data, the second data being a machine learning model.

Sometimes, determining, by the server, whether the requested access to the first data and the second data is authorized based on the received MPC shares and the one or more MPC authorization functions associated with the digital contract can include determining that a threshold quantity of users are required to provide permission for the data processing operations to execute. The threshold quantity of users can include all users. All the users can include the party A system and the party B system. The method can also include performing, by the server, the data processing operations. The method can include performing, by a secure platform provided by party B, the data processing operations, the secure platform being a secure enclave that restricts party B's access.

Sometimes, the first data includes big data. The first data can include a group of datasets. The first data can include raw trade data. The first data can include pharmaceutical trials data. The first data can include defense engineering data. The first data can include aerospace engineering data. The second data can include at least one machine learning model. The secure environment can be an MPC system. The secure environment can be a secure enclave of a TPM. The secure environment can be a secure enclave of an HSM.

In some implementations, the authorization data can include each of the party A system and the party B system signed shares of a cryptographic key associated with a digital contract between the party A system and the party B system. Performing, by the server, processing operations using the first data and the second data in a secure environment can include: providing the first data as input to the second data to generate the output. The first data can be raw trade data and the second data can be a machine learning model, and performing, by the server, processing operations using the first data and the second data in a secure environment can include providing the raw trade data as input to the machine learning model to generate output, the output including secondary business data or commercial insights data. The processing operations can be performed until at least one of the party A client device and the party B client device rescinds its respective authorization data.

In some implementations, the method can include creating, by the server system, a digital contract between the party A system and the party B system, where creating the digital contract can include establishing an MPC group for sharing a cryptographic key and authenticating requests to access data between the party A system and the party B system, instructing, by the server, each of the party A system and the party B system to generate shares of the cryptographic key associated with the digital contract, and receiving, by the server and from each of the party A system and the party B system, respective shares of the cryptographic key. The creating, by the server system, a digital contract operation can be performed before receiving, by a server and from a party B system, (i) a request to access first data of a party A system and (ii) second data of the party B system.

Sometimes, performing, by the server, processing operations using the first data and the second data can include: processing the first data into a group of data segments, processing the second data into a group of machine learning operations, and performing the processing operations for each of the group of machine learning operations, where each of the group of machine learning operations can include a group of permission requests to access one or more of the group of data segments. The authorization data can include signed payloads from each of the party A system and the party B system. Sometimes, the method can include encrypting, by the server, the first data with signatures from the signed payloads, transmitting the encrypted first data to a hardware security module ("HSM"), the HSM being configured to perform the processing operations using the encrypted first data and the second data in a secure environment of the HSM, and receiving, by the server and from the HSM, the output from the processing operations. The HSM can be a trusted platform module ("TPM").

One or more embodiments described herein can include a system for managing, authenticating, and authorizing data sharing between multiple parties utilizing multi-party-computation ("MPC") techniques, the system including: a party A system having first data, a party B system having second data, and a server system that can be configured to communicate with the party A system and the party B system, the server system including an MPC subsystem that can be configured to perform operations including: receiving, from the party B system, (i) a request to access the first data and (ii) the second data, sending, to the party A system and the party B system, an authorization request to authorize the request to access the first data, receiving, from the party A system and the party B system, MPC shares associated with trusted third party processing of data from party A and party B, the MPC shares having been generated as part of a digital contract between party A and party B permitting for combining the first data and the second data within an environment of the trusted third party provided by the server, to which neither party A nor party B have access, retrieving one or more MPC authorization functions associated with the digital contract, determining whether the requested access to the first data and the second data is authorized based on the received MPC shares and the one or more MPC authorization functions associated with the digital contract, performing, based on a determination that the requested access is authorized, data processing operations using the first data and the second data in a secure environment, and returning output from the data processing operations.

The system can optionally include one or more of the above mentioned features.

The devices, system, and techniques described herein may provide one or more of the following advantages. For example, the disclosed technology can enable cryptographically assured authentication and authorization to third party data for data mining or other similar purposes, while enabling data governance controls between transacting parties. The disclosed MPC architecture can secure data sharing between and amongst parties to provide trust between the parties so that additional insights can be derived from access to the third party data. The disclosed technology may also enhance trust features since each party can continually maintain auditing and authorization power over what data is shared in the MPC architecture, which can unilaterally be rescinded by either party, and when the data is shared. Any of the parties may rescind their cryptographically signed authorization to share their data or other assets at any time. Once a party rescind their cryptographically signed authorization, their data is pulled from the MPC architecture and any processing or data mining is immediately stopped. The parties' data can remain secure, untampered, and kept out of the hands of other parties that may try to steal, duplicate, or otherwise compromise the parties' data (e.g., especially in the case of raw trade data that may be confidential, such as pharmaceuticals data, defense engineering data, aerospace data, etc.).

The disclosed technology similarly can provide increased security of any type of assets, such as cryptocurrencies, data, data processing techniques and models (e.g., ML models), other digital assets, and blockchain-based information (e.g., non-fungible tokens (NFTs), digital records). After all, a central server system does not maintain control over parties' data and/or decisions. Rather, such control remains with the transacting parties themselves. Moreover, the server system may not have access to, or otherwise come into possession or control of a crypto private key for any party's data, and therefore may be unable to retrieve the crypto private key. Instead, the crypto private key may be generated at an HSM solely at the direction of the authorized users. The generation of the crypto private key can be conditioned upon confirmation through an access control system (e.g., policy engine) for which only a particular party (e.g., a party initiating a transaction) has the ability to define parameters for key generation. Such a multi-factor security system described herein may also provide that neither the transacting party nor the server system is independently able to complete a transaction in cryptocurrency controlled by the party's wallet. The server system may not initiate, view contents of, and/or stop a transaction by the party. The server system also may not have independent control of the party's data, the signing policies defined by the party, or any given transaction.

Similarly, the disclosed technology allows for parties to maintain control over role and policy updates in real-time, thereby eliminating operational risk and/or third-party dependencies to perform transactions over various networks. Therefore, the parties can have self-management of workflow policies to control asset movements, which can reduce or eliminate gaps in operating models. The parties can also have self-management of access controls to regulate employee permissions and reduce or eliminate gaps in risk models.

The disclosed technology provides an agile MPC framework, infrastructure, and engine architecture to support various different networks, such as blockchains. As a result, the disclosed technology eliminates or otherwise mitigates a need for retail wallets or cumbersome hardware. Similarly, the disclosed technology can remain online and secure, even when new protocols or updates are made to the technology, since updates may simply be made to HSM crypto-libraries. Therefore, MPC algorithms and other techniques employed by the disclosed technology may not be required to be reconfigured from the ground up whenever a new blockchain is added and/or new assets are added. The architecture of the disclosed technology therefore results in short lead times, low engineering costs, and less or no time being offline or otherwise unavailable to parties.

In another example, the disclosed technology can be used and extended to any of a variety of contexts to improve overall security and control related to MPC transactions, such as blockchain transactions related to cryptocurrencies, digital records, and/or other blockchain assets. The disclosed technology can additionally be used outside of a specific blockchain context, and may be more broadly applicable to provision and management of MPC authentications and authorizations related to digital interactions that may require the consent of multiple parties for fulfillment. The disclosed technology may also be used to secure core infrastructure as an additional layer for supervisory control and data acquisition (SCADA) systems. The disclosed technology can be used to secure access to high security assets (e.g., buildings, vaults). The disclosed technology can be implemented as part of an approval business workflow that may require multiple parties to engage at multiple different levels of the business structure. In yet some implementations, the disclosed technology can be used to enable kill chains for various types of battle systems.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to a modular MPC architecture with one or more authentication layers to provide secure sharing of data between multiple parties. The authentication layers can provide for secure digital identifiers, secure policy signing, secure hardware identifications, secure transactions, secure code execution, and/or secure infrastructure (e.g., using hardware security modules, HSMs). As a result, the disclosed technology can provide agile private key management to various different parties transacting across networks (e.g., blockchains). Secret material can, for example, be split up (e.g., shard) into n pieces to be held by different signing parties across different servers, hardware, devices, jurisdictions, etc. to ensure that no single party has access to such secret material. Thus, the secret material can be secured. When a party desires to execute a transaction, such as share data with the other party for data mining, the members of the party can provide a combined set of secrets for purposes of computing a set of credentials to allow signing of the transaction. In combination, the disclosed technology provides a singular process that continues to build on cryptographic evidence (e.g., a signing policy associated with a transaction request and/or a particular transaction-requesting party), execution of a signing policy, and cryptographic signatures of every required signing party to cumulatively output cryptographic authorization for signing the transaction. The disclosed technology can provide cryptographically assured authentication and authorization to third party data for data mining, while enabling data governance controls between the parties.

Figure 1:
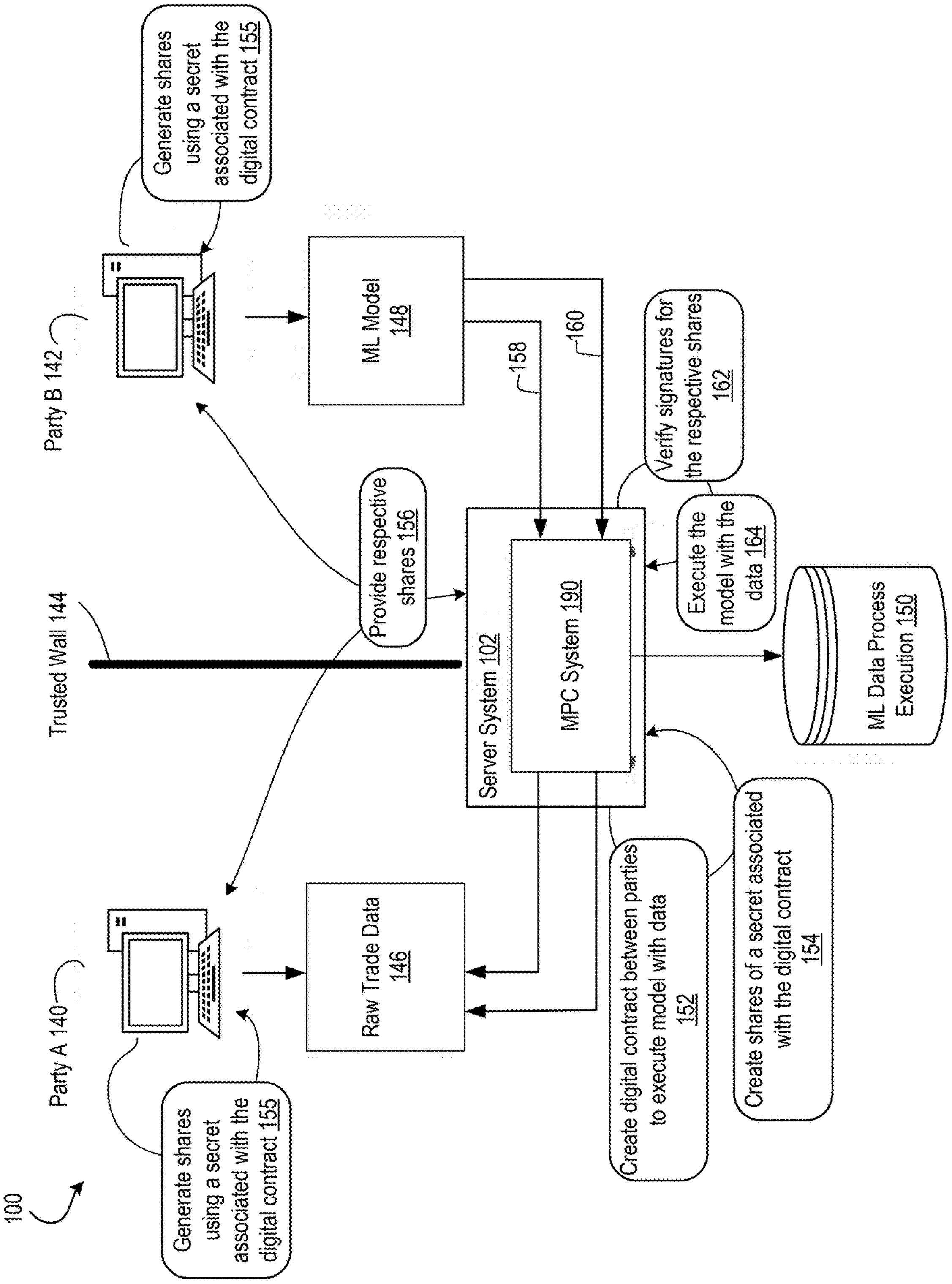
FIG. 1 is a conceptual diagram of a system for providing secure data sharing between parties using an MPC system.

Referring to the figures, FIG. 1 is a conceptual diagram of a system 100 for providing secure data sharing between parties using an MPC system 190. The MPC system 190 can be part of a server system 102 (e.g., refer to FIG. 5 for further discussion). The MPC system 190 can be similar to or the same as an MPC6 system 113, described further in reference to at least FIG. 5. The MPC system 190 can establish an effective trusted wall between party A 140 and party B 142, who may engage in data sharing transactions with each other. Accordingly, the MPC system 190 can serve as a cryptographic escrow between data sharing parties. The disclosed technology can require both parties to sign using the MPC technology described herein for execution of a machine learning model 148 of the party B 142 with raw trade data 146 of the party A 140. The MPC system 190 can be an arbiter of access to both data, and should any party un-sign and thus rescind access, the model 148 may no longer be available for execution in the MPC system 190 and/or the data 146 is pulled back and returned to the party A 140. Thus, as a middleman, the MPC system 190 allows the parties to share bits of their data or other types of information or intellectual property and also allow either party to rescind, inherently creating a trusted and secured environment for gleaning additional insights and data from such data sharing. Most existing frameworks in banking, for example, are compliance frameworks, but such frameworks done provide and protect ownership and sovereignty around data protection. The disclosed MPC architecture can resolve this issue.

Although FIG. 1 shows the MPC system 190 as performing the operations described herein, any of these operations can be performed by another server, server system, enclave, or other type of secured environment.

A digital contract can be created at the server system 102 between the parties to execute a machine learning model 148 of the party B 142 with raw trade data 146 of the party A 140 (block 152). The digital contract can be created to allow the data 146 to be processed against the specific model 148. The raw trade data 146 can include a variety of types of data and/or information. As non-limiting illustrative examples, the raw trade data 146 may include pharmaceutical data, defense data, healthcare data, PII, gasoline volume data, gasoline price data, data from different vendors, or any other type of data.

Figure 5:
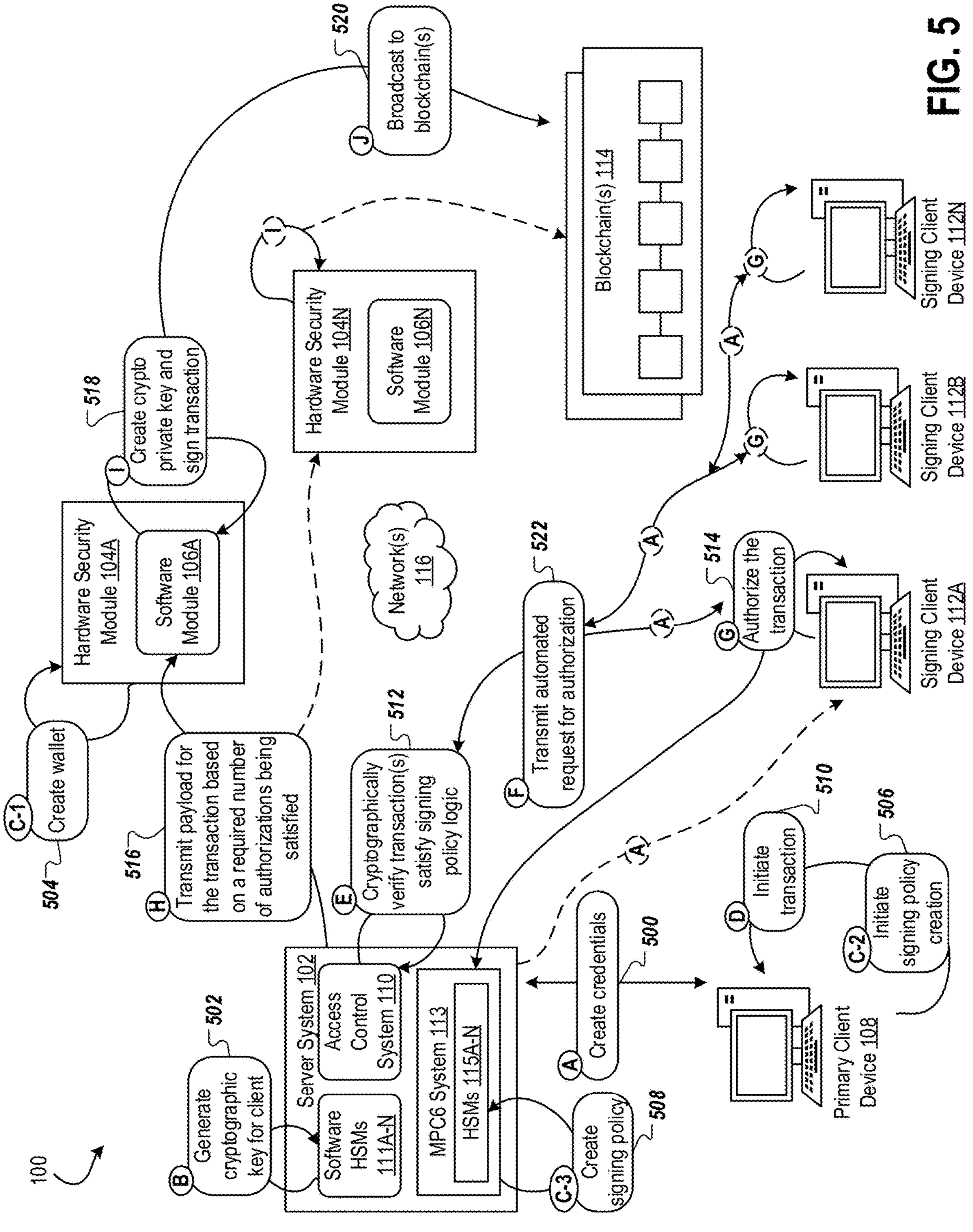
FIG. 5 is a conceptual diagram of a system for providing non-custodial crypto asset management using MPC techniques for parties to securely perform transactions over various networks.
Figure 6:
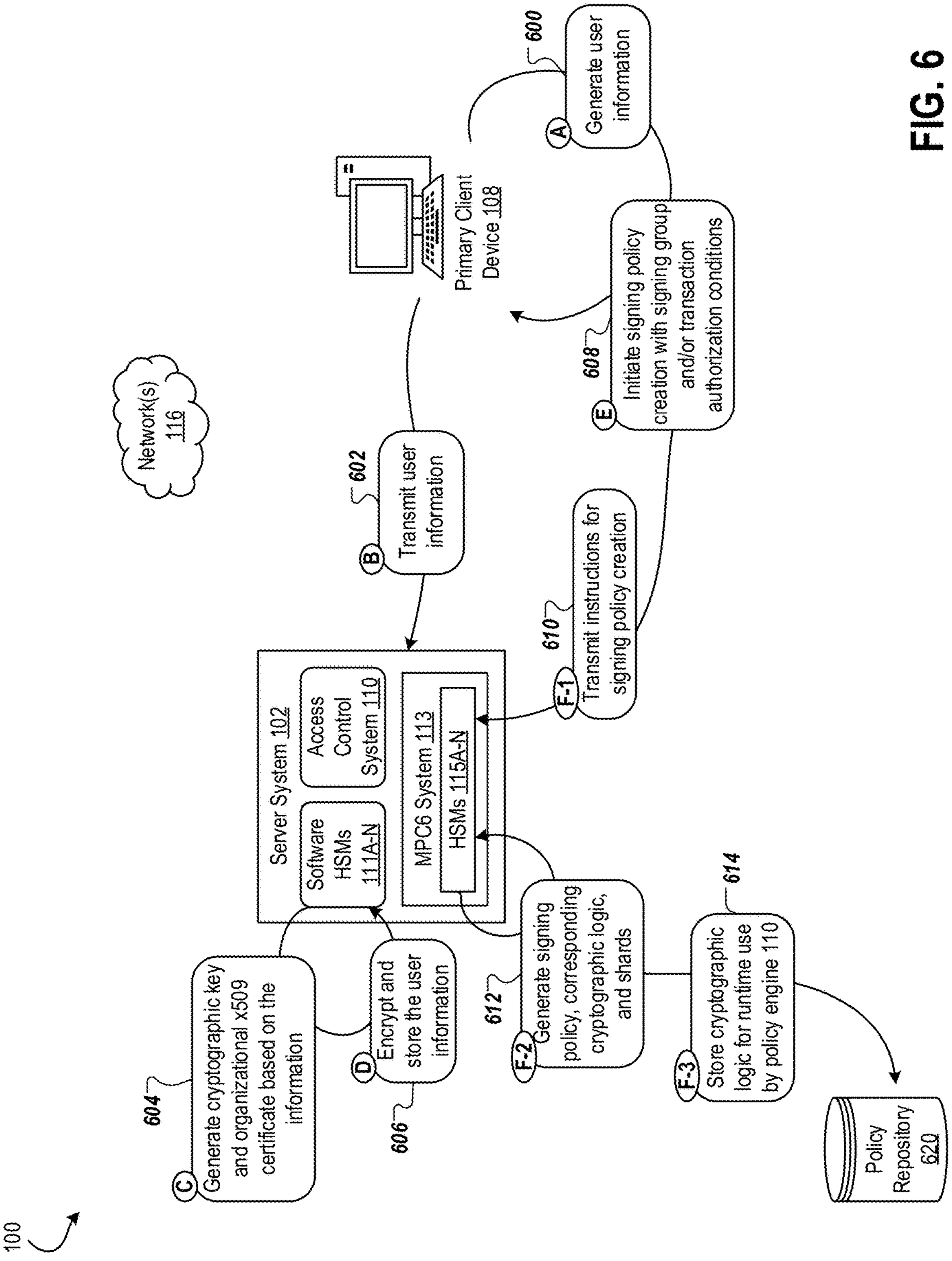
FIG. 6 is a conceptual diagram of a system for generating private keys.
Figure 7:
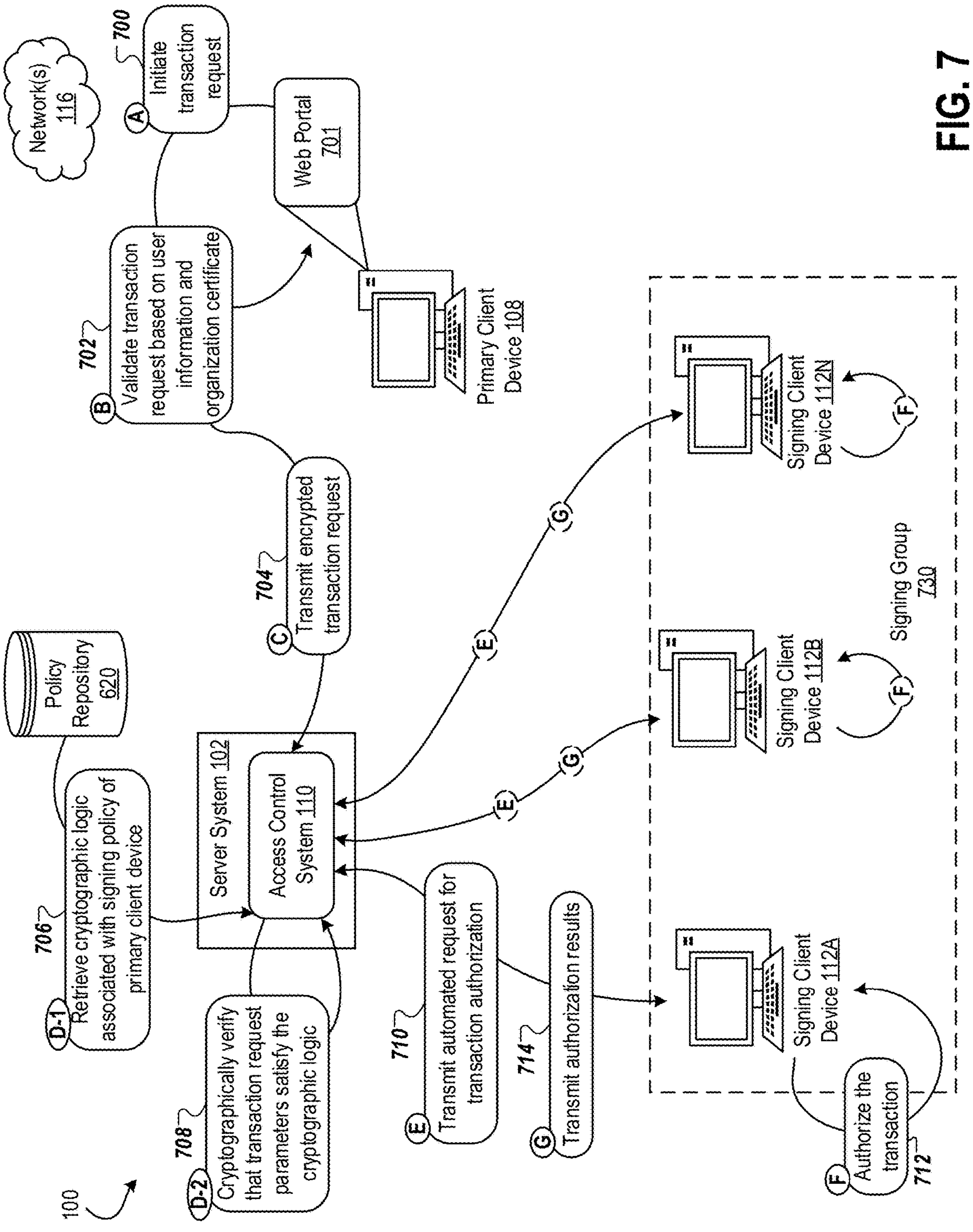
FIG. 7 is a conceptual diagram of a system for initiating transactions and obtaining approval or authorization by signing client devices according to user-defined signing policies.

Shares of a secret (e.g., key) associated with the digital contract can also be created at the server system 102 (block 154). Refer to FIGS. 5-7 for further discussion.

Each of the parties A 140 and B 142 can generate shares using the secret associated with the digital contract (block 155).

The parties can also provide their respective shares to the server system 102 (block 156). For example, the parties can provide their shares to the server system 102 when a request for data is made by one of the parties.

In the example of FIG. 1, party B 142 can ask permission to use the raw trade data 146 (block 158). This request can be provided to the MPC system 190.

Party B 142 may also provide data, such as auditable machine learning model operations to the MPC system 190 in block 160.

Both parties can approve party B 142's permission to use the data 146 by providing their respective shares (block 156) (e.g., signing authorization requests according to signing policies).

The MPC system 190 can verify signatures for the respective shares (block 162) and then execute the model 148 with the data 146 in a secure environment (e.g., enclave) of the MPC system 190 and according to machine learning data process execution rule sets 150. Party A 140 can always maintain an ability to audit which of their datasets are used and with which model from Party B 142. If party A 140 does not approve of the sharing/use, then party A 140 can always rescind their shares, which can immediately stop the data sharing in the bridge created by the MPC system 190. Such auditing power allows each of the parties to maintain governance and sovereignty over the data they share while also ensuring trust can be formed between the parties. Each of the parties can audit what data is shared, how the data is shared, and/or how the data is used. If either party does not approve of the sharing and/or use of their data, they can rescind their approval, which can cause their data to be immediately pulled back and securely returned to them.

In some implementations, blocks 152, 154, 155, and 156 can be performed at a first time and blocks 158, 160, 162, and 164 can be performed at a second time. The second time can be after the first time. The first time, for example, can be a first time that the parties A 140 and B 142 decide to contract and share their data. During future times whenever the parties desire to share their data with each other, blocks 158, 160, 162, and 164 can be performed.

Figure 2:
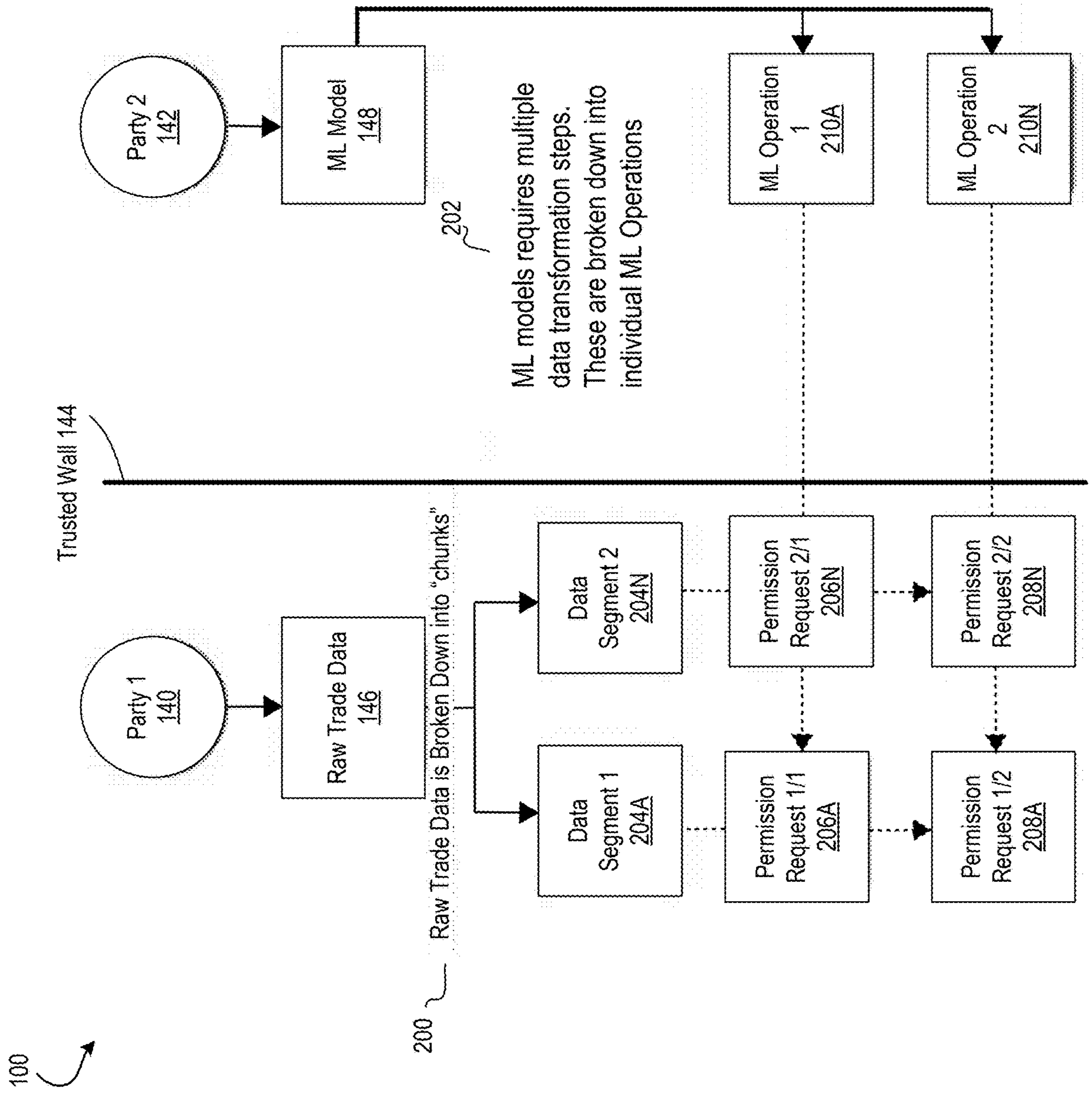
FIG. 2 is a conceptual diagram of a system for breaking up data into chunks and securely sharing the data between parties using an MPC system.

FIG. 2 is a conceptual diagram of the system 100 for breaking up the raw trade data 146 of party A 140 into chunks and securely sharing the data between the parties 140 and 142 using an MPC system described herein. Deriving commercial value from data often requires data at scale. The system 100 can break up the data 146 and/or the model 148 operations into multiple data chunks and/or operations so that execution can be efficient. The disclosed system 100 can advantageously work on large datasets as well as increasingly complex machine learning models, by breaking down both the data and machine learning operations into smaller sets of MPC authorization requests. The model 148 can be heavy and have multiple different operations. The data 146 can include large datasets, such as big data. Breaking up the data 146 into smaller bite-size chunks as well as the model 148 can provide more granular levels of control for the parties 140 and 142 over how the data is used. These techniques can also provide a degree of auditability to help maintain data compliance standards where they apply.

The raw trade data 146 of the party 140 can be broken down into chunks, such as data segments 204A-N(block 200).

Similarly, on the other side of the figurative trusted wall 144, the model 148 may require multiple data transformation steps, so these steps can also be broken down into individual machine learning operations 210A-N(block 202).

Each of the operations 210A-N can make respective permission requests to access one or more of the data segments 204A-N. For example, the operation 210A can make permission requests 206A and 206N, where the permission request 206A is to access the data segment 204A and the permission request 206N is to access the data segment 204N for execution. The operation 210N can make permission request 208A to access the data segment 204A and permission request 208N to access the data segment 204N for execution of the operation 210N. Various other implementations of chunking and permission requesting are also possible.

Figure 3:
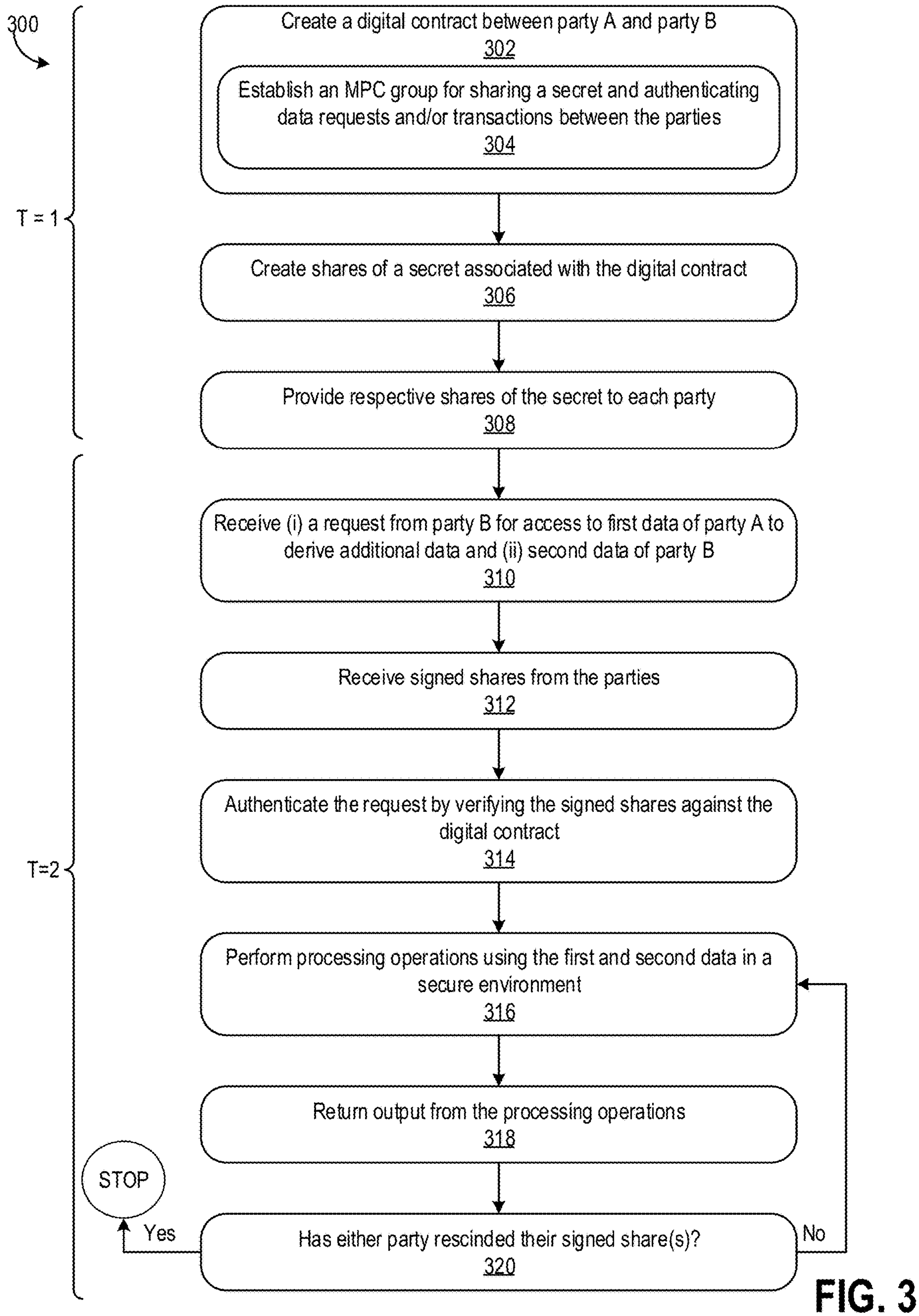
FIG. 3 is a flowchart of a process for establishing a secure relationship between parties and providing secure data sharing between the parties.

FIG. 3 is a flowchart of a process 300 for establishing a secure relationship between parties and providing secure data sharing between the parties. The process 300 can be performed by the MPC system 190, the MPC6 system 113, the server system 102, or any other type of computing system and/or secure computing environment described herein. For illustrative purposes, the process 300 is described from the perspective of a server system.

Referring to the process 300, blocks 302-308 can be performed at a first time, t=1, and blocks 310-320 can be performed at a second time, t=2. The blocks 302-308 can be performed in a process that is separate than blocks 310-320. Blocks 302-308 can be performed only once, in some implementations, to establish a relationship between multiple parties that are sharing data with each other. In some implementations, blocks 302-308 can be performed for each particular data sharing transaction between the multiple parties. For example, the blocks 302-308 can be performed when the multiple parties agree to share data A of one party with data B of the other party. The blocks 302-308 can be performed again when the multiple parties agree to share data Z of the one party with data X of the other party. Therefore, every time that the parties desire to share different types of data with each other, the blocks 302-308 can be performed. Moreover, blocks 30-320 can be performed every time that the parties agree to share data, as described herein. The first time t=1 can be a setup and/or initiation time. The second time t=2 can be a runtime and/or execution time.

Still referring to the process 300, in block 302 at t=1, the server system can create a digital contract between party A and party B. For example, the server system can establish an MPC group for sharing a secret and authenticating data requests and/or other types of transactions between the parties (block 304). Refer to at least FIGS. 5-7 for further discussion about establishing the MPC group and creating the digital contract.

In block 306, the server system can create shares of a secret (e.g., cryptographic key) associated with the digital contract. Block 306 can also be performed at t=1.

The server system can provide respective shares of the secret to each party (block 308). As described in reference to at least FIG. 1, each of the parties can generate their shares and provide them to the server system. For example, the server system can instruct each party (e.g., party A client device and party B client device) to generate shares of the secret/cryptographic key associated with the digital contract (block 306) and then receive, from each party, respective shares of the cryptographic key (block 308). Their shares can also be provided to the server system as part of authorizing and authenticating a request from one of the parties to access the other party's data. Block 308 can be performed at t=1. Sometimes, block 308 can be performed at t=2, for example in response to performing block 310.

At t=2, the server system can receive (i) a request from party B for access to first data of party A to derive additional data and (ii) second data of party B (block 310). The first data can include raw trade data and the second data can include machine learning models that can use the raw trade data as model input to generate output such as business or commercial value or other insights. As described herein, the first data, or the raw trade data, can include any type of data that may be used in different industries and/or by different vendors, entities, and/or end users/customers to glean insight (e.g., the model output). As a merely illustrative, non-limiting example, the first data can include gasoline volumes and/or prices by different vendors across a group of users/clients. This data can be securely fed into at least one machine learning model to generate output indicating, for each user/client, whether they would be getting a good or bad price for the gasoline, without disclosing the underlying data (the gasoline volumes and/or prices) to each user/client.

The server system can receive signed shares from the parties in block 312, which can be used to authenticate and authorize the request from party B by the server system.

Accordingly, in block 314, the server system can authenticate the request by verifying the signed shares against the digital contract. The server system can perform the techniques described in reference to FIGS. 5-7 in order to authenticate the request.

Once the request is authenticated, the server system can perform processing operations using the first and second data in a secure environment (block 316). In the illustrative example of FIG. 1, the first data can include large datasets of raw trade data and the second data can include machine learning models. The server system can act as a bridge between the parties by providing a secure environment (e.g., a secure enclave) where the machine learning model(s) can be run with the raw trade data to generate output, such as business value and/or secondary information/data. The model, for example, can be fed the data (e.g., unidirectional flow of information). As described in reference to FIG. 2, performing the processing operations can include breaking up the raw trade data into data chunks and/or breaking up the model operations into individual operations. The individual operations can then be executed one by one by the server system, which can allow for more auditability of the processing operations and more granular party-control over usage of the raw trade data and the model(s).

In block 318, during t=2, the server system can return output from the processing operations.

The server system can determine whether either party has rescinded their signed shares in block 320. If either party rescinded their signed share(s), then the process 300 can stop and the first data can be returned to party A and the second data can be returned to party B.

If neither party has rescinded their signed share(s), then the process 300 can continue, such as iterating back through block 316-318 until (i) the processing operations are complete and/or (ii) either of the parties rescind their signed share(s). For example, the server system can continue to execute each of the operations of the model that comprise the model(s) (e.g., the second data) with the different data chunks that comprise the raw trade data (e.g., the first data). If a party rescinds their signed share(s) at any point while the processing operations are being performed, the current process may be stopped/paused and subsequent operations may not be performed. As a result, the parties can continue to maintain control of their respective data and how their data is being used in the processing operations of block 316.

Figure 4:
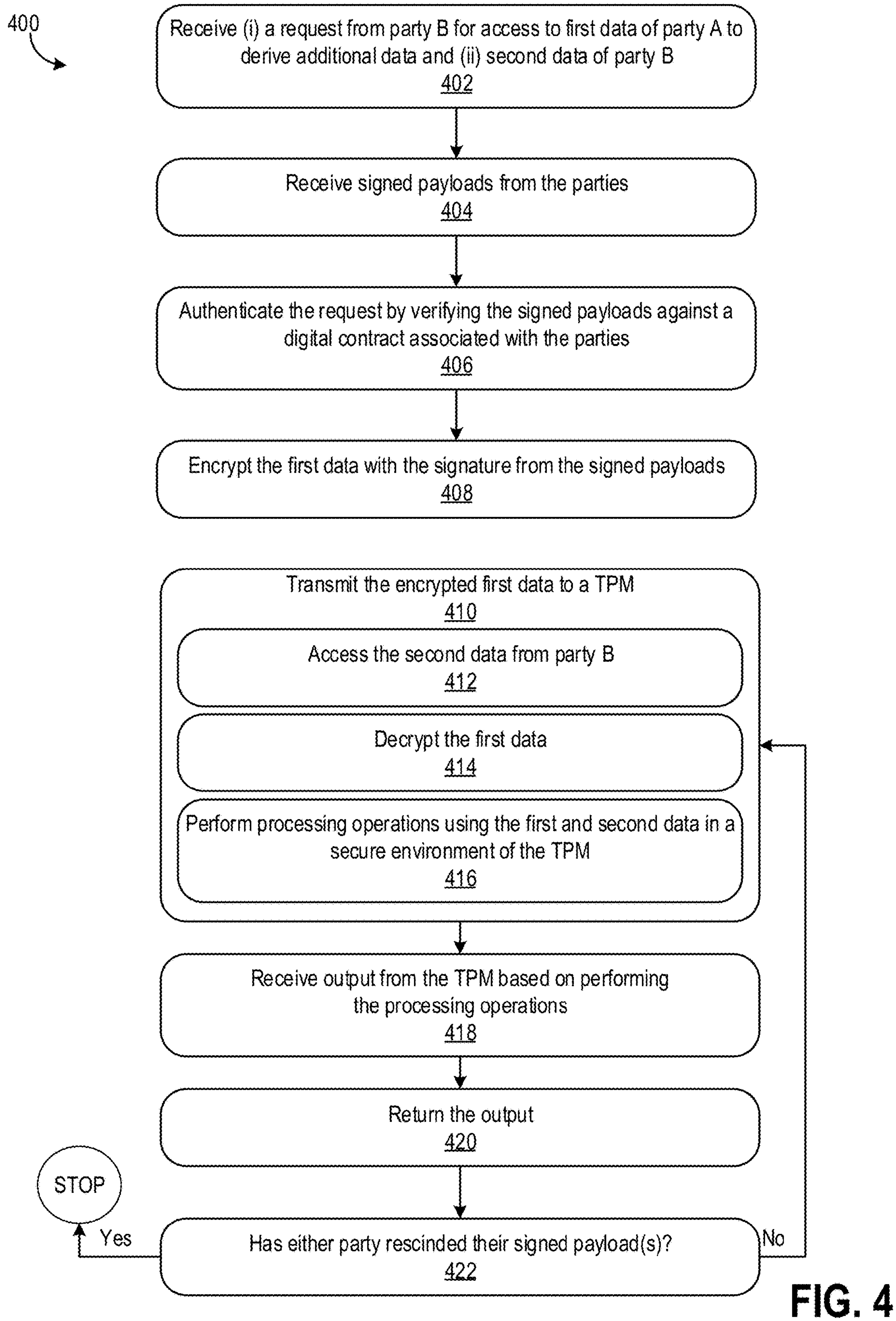
FIG. 4 is a flowchart of a process for providing secure data sharing between parties using a trusted platform module (TPM).

FIG. 4 is a flowchart of a process 400 for providing secure data sharing between parties using a trusted platform module (TPM). The TPM can be a type of HSM embedded in a processing chip of a computing system (e.g., server). The TPM can leverage natural cryptographic logic and a .net platform to secure interactions between an HSM and a secure network itself, such as a blockchain, or other computing systems described herein. The TPM can allow for specific types of operations to be executed that are provably secure. Functions (e.g., operations, software processes) that typically would be performed at an HSM now can go through the TPM using the disclosed technology, in which the TPM can act as a proxy to the HSM. Although the process 400 is described with respect to performing processing operations of shared data in a TPM, the process 400 can also be used to perform the processing operations in an HSM (instead of or in addition to the TPM). Performing the processing operations within a secure environment of a TPM and/or an HSM can beneficially provide extra layers of security and trust for the transacting, data-sharing parties. Performing the operations within the TPM and/or HSM can prevent users, such as malicious actors, from potentially backdooring data that is shared to perform the processing operations.

The process 400 can be performed by the MPC system 190, the MPC6 system 113, the server system 102, or any other type of computing system and/or secure computing environment described herein. For illustrative purposes, the process 400 is described from the perspective of a server system.

Referring to the process 400, the server system can receive (i) a request from party B for access to first data of party A to derive additional data and (ii) second data of party B (block 402). Refer to block 310 in the process 300 of FIG. 3.

In block 404, the server system can receive signed payloads from the parties. Refer to block 312 in the process 300 of FIG. 3.

Using the disclosed techniques, the server system can authenticate the request by verifying the signed payloads against a digital contract associated with the parties (block 406). Refer to block 314 in the process 300 of FIG. 3.

In block 408, the server system can encrypt the first data with the signature from the signed payloads. The first data can be encrypted using any of the techniques described herein, such as in FIGS. 5-7.

The server system can then transmit the encrypted first data to a TPM (block 410). At the TPM, the second data from party B can be accessed (block 412). The first data can be decrypted (block 414). Processing operations using the first and second data can be performed in a secure environment of the TPM (block 416). Refer to at least block 316 in the process 300 of FIG. 3 for further discussion.

The server system can receive output from the TPM based on performing the processing operations in block 418. The server system can return the output in block 420. Refer to block 318 in the process 300 of FIG. 3.

In block 422, the server system can determine whether either party has rescinded their signed payload(s). If either party rescinded their signed payload(s), the process 400 can stop. If one of the parties rescinded their signed payload(s), then the process 400 can return to blocks 410, 412, 414, and/or 416, and iterate through the remaining blocks in the process 400 until (i) one of the parties rescinds their signed payload(s) and/or (ii) the processing operations are completed.

FIG. 5 is a conceptual diagram of the system 100 for providing non-custodial crypto asset management using MPC techniques for parties to securely perform transactions over various networks. For example, as described in reference to FIGS. 1-4, the system 100 can be used to perform secure data sharing between multiple parties. The system 100 and the disclosed technology can be applied to various use cases outside of cryptocurrency transactions, such as various data sharing transactions, banking transactions, etc. The system 100 can also be used to perform cryptocurrency transactions over various ledgers, including but not limited to blockchains. The system 100 can be used to perform various other types of transactions, including but not limited to smart contract execution, other legal contract execution, etc. Although the system 100 is described in the perspective of cryptocurrency transactions, the system 100 can also be implemented and used in other use cases, including but not limited to healthcare, banking, contracting, legal industry, etc.

In the system 100, a server system 102, hardware security modules (HSMs) 104A-N, primary client device 108, and signing client devices 112A-N, and blockchain(s) 114 can communicate with each other (e.g., wired, wirelessly) via network(s) 116. The server system 102 can be any type of computing system, network of computing devices/systems, cloud-based computing system, secure enclave, etc. that can be configured to provide software to components such as the HSMs 104A-N, the primary client device 108, and the signing client devices 112A-N. The server system 102 can be used to generate and compute MPC-based authentication and authorization requests, which may be presented at a later time to the HSMs 104A-N as proof of authorization for signing and broadcasting to the relevant blockchain(s) 114.

The server system 102, for example, can include an access control system 110, software HSMs 111A-N, and an MPC6 system 113. The MPC6 system 113 can further include one or more HSMs 115A-N. The access control system 110 can implement any type of techniques and/or approach(es) to maintain access control across different networks, systems, applications, and/or use cases. As merely an illustrative example, the access control system 110 can provide for role-based access control, attribute-based access control, or a combination thereof. In some implementations, the access control system 110 can be a policy engine. The policy engine, for example, can be used in the context of crypto transactions.

In some implementations, the access control system 110 can be a software module deployed in one or more other computing environments, including but not limited to an enclave or one or more of the components described herein. The access control system 110 can be configured to perform one or more of the disclosed techniques, such as ensuring that transactions requested by the primary client device 108 satisfy signing policies and parameters that are defined by the primary client device 108. The access control system 110 can designate and administer differing conditions and levels of confirmation from one or more of the signing client devices 112A-N for various transactions associated with a wallet (such as a public wallet associated with the primary client device 108). The access control system 110 can communicate and interact with other components in the system 100, such as a software module 106A-N at each of the HSMs 104A-N, the blockchain(s) 114, other components of the server system 102, and other client devices to authorize transactions on public wallets. The access control system 110 is described further in reference to at least FIGS. 5 and 6.

In brief, the HSMs 104A-N can each be a physical computing device that safeguards and manages secrets, such as digital keys, performs encryption and decryption functions for digital signatures, and provides authentication and/or other cryptographic functions. HSMs 104A-N can be plug-in cards and/or external devices that attach to computing systems, computing devices, and/or network servers. In some implementations, one or more of the HSMs 104A-N can be operated by and/or configured to the server system 102. One or more of the HSMs 104A-N can be remote from the server system 102 and configured to one or more computing systems, computing devices, network servers, and/or networks of computing devices associated with third parties. For example, a third party can host one or more of the HSMs 104A-N, which then communicate with components in the system 100 such as the server system 102.

Each of the HSMs 104A-N can include respective software modules 106A-N(e.g., multiple different instances of the software module across different HSMs 104A-N), which can be generated and provided to the HSMs 104A-N by the server system 102. The software module 106A-N can provide instructions for the HSMs 104A-N to create crypto private keys and sign transactions that are requested by the primary client device 108, authorized by a required threshold number of the signing client devices 112A-N, and then verified by the access control system 110 of the server system 102 for satisfying requirements of the signing policy of the primary client device 108.

The primary client device 108 and signing client devices 112A-N can be any types of user computing devices, including but not limited to laptops, tablets, computers, mobile phones, smart phones, wearable devices, cloud-based computing systems, and/or networks of computing systems/servers. The primary client device 108 and the signing client devices 112A-N can provide the software platform generated by the server system 102 to their relevant users/parties. In some implementations, the primary client device 108 can be any one of party A 140 and party B 142 described in reference to FIG. 1. For example, the primary client device 108 can be the party B 142, which requests to access data from the party A 140 for use in running one or more machine learning models and generating results from the models' execution. Although FIG. 5 is described from the perspective of completing a crypto transaction over the blockchain(s) 114, one or more blocks in FIG. 5 can also be performed to authenticate the request from the party B 142 and provide the requested data sharing and models' execution in a secure environment, such as within the server system 102, the MPC6 system 113, another MPC system (e.g., refer to MPC system 190 in FIG. 1), the HSMs 104A-N, and/or a TPM (e.g., refer to FIG. 4).

In the illustrative example of FIG. 5, the primary client device 108 can be operated by a party (e.g., user) that creates a wallet (e.g., public wallet) and uses the software platform generated and provided by the server system 102 to perform transactions in the system 100 (e.g., cryptocurrency transactions). The party also can establish signing policies with defined parameters (e.g., a minimum required number of signing client devices that must authorize a transaction before the transaction is verified, signed, then broadcasted) that are then used by the access control system 110 to verify transactions that are requested by the primary client device 108.

The signing client devices 112A-N can be operated by other parties (e.g., users) that are selected to be part of one or more signing groups according to the signing policies and parameters defined by the primary client device 108. The signing client devices 112A-N can also run the software platform provided by the server system 102 to allow the associated parties to authorize (or not authorize) transaction requests that are made by the primary client device 108 or other client devices that request transactions across networks such as the blockchain(s) 114.

The blockchain(s) 114 can be any type of system and/or ledger that records transactions, such as cryptocurrency transactions. The blockchain(s) 114 can allow digital information to be recorded and distributed, but not edited/modified. Thus, the blockchain(s) 114 can be an immutable ledger, or record of transactions that cannot be altered, deleted, or destroyed. The blockchain(s) 114 can be maintained across multiple computing systems that may be linked over one or more networks. The blockchain(s) 114 can include public blockchains (e.g., permissionless distributed ledger on which anyone can join and conduct transactions), private blockchains (e.g., a blockchain network that may operate in a private context, such as a restricted network, or is controlled by a single entity), hybrid blockchains, etc.

Still referring to the system 100 in FIG. 5, the primary client device 108 and the server system 102 can communicate to create user credentials (as non-limiting examples, these can include username, password, etc.) in block A (500). The server system 102 can also optionally communicate with one or more of the signing client devices 112A-N to create user credentials for parties associated with the devices 112A-N. For example in block A (500), the server system 102 can communicate with the signing client devices 112A-N that do not yet have user credentials established but have been identified as part of a signing group for a signing policy of the primary client device 108. The server system 102 can communicate with the client devices 112A-N before or after one or more other blocks described herein (e.g., after the primary client device 108 creates a signing policy in block C-3, 508, as part of transmitting an automated request for transaction authorization in block F, 522, before verifying that a transaction satisfies the signing policy in block E, 512, etc.). Refer to FIG. 6 for further discussion.

One or more of the software HSMs 111A-N of the server system 102 can generate a cryptographic key for the primary client based on the user credentials in block B (502). The process to generate the key can be initiated at the primary client device 108 and executed by the one or more software HSMs 111A-N. Refer to FIG. 6 for further discussion.

In block C-1 (504), the HSM 104A can create a wallet for the primary client device 108, based at least in part on the user credentials and public key infrastructure (PKI) certificates.

In block C-2 (506), the primary client device 108 can initiate creation of a signing policy. Instructions to create/generate the signing policy can be transmitted to the server system 102 (e.g., in plain text format). Accordingly, the HSMs 115A-N of the MPC6 system 113 at the server system 102 can create the signing policy according to parameters defined by the primary client device 108 in block C-2, 506 (block C-3, 508). The signing policy can be created at the server system 102 with multiple different transaction values and/or business logic. Creating the signing policy can, for example, include generating cryptographic logic to then be executed by the access control system 110 during runtime use.

The primary client device 108 can initiate a transaction request in block D (510). Refer to FIG. 7 for further discussion. As described in reference to FIGS. 1-4, the primary client device 108 can initiate a request to perform data sharing with multiple other parties (e.g., parties for which the primary client device 108 already has a digital contract established, parties that the primary client device 108 seeks to create a digital contract with).

The transaction request can be sent to the access control system 110, which can cryptographically verify that the transaction request satisfies the signing policy cryptographic logic (block E, 512). Refer to FIG. 7 for further discussion. The access control system 110 can also determine, based on transaction details in the transaction request, how many signing client devices are required.

The access control system 110 can transmit an automated request for transaction authorization to the determined number of the signing client devices 112A-N needed for authorizing the particular transaction request (block F, 522). In some implementations, the request can be sent to a threshold quantity of the signing client devices 112A-N that is greater than a required number of signing client devices 112A-N to authorize the transaction. The request can be sent to just the required number of signing client devices 112A-N to authorize the transaction, as mentioned above. Refer to FIG. 7 for further discussion. Moreover, in some implementations, the server system 102 can receive the authorization requests and broadcast those requests to the signing client devices 112A-N.

One or more of the signing client devices 112A-N can authorize the transaction request (block G, 514). Authorization results can be transmitted from the signing client devices 112A-N to the MPC6 system 113. The MPC6 system 113 may communicate the authorization results to the access control system 110. In some implementations, the signing client devices 112A-N can provide information to data providers described herein, such as party A 140 and/or party B 142. The authorization results, for example, can be transmitted to the devices of the parties 140 and/or 142 in FIG. 1.

If the access control system 110 determines that the required number of signing client devices 112A-N(as defined by the signing policy or other parameters defined by the primary client device 108) authorize the transaction in G (514), the access control system 110 can transmit a payload for the transaction to the one or more HSMs 115A-N to perform an MPC signing operation to then generate the authorization payload that will be presented/transmitted to the software module 106A-N of one or more of the HSMs 104A-N(block H, 516). As described further below, once the HSMs 104A-N receive the authorization payload from the HSMs 115A-N, the HSMs 104A-N can sign and broadcast the transaction to the blockchain(s) 114.

The software module 106A-N can then create a crypto private key for the primary client device 108 and sign the transaction based on information provided in the payload (block I, 518). For example, the software module 106A of the HSM 104A can receive the cryptographic logic that is generated as part of creating the signing policy and use the logic to validate the authorization results from the signing client devices 112A-N and sign the transaction.

The signed transaction is then broadcasted to the blockchain(s) 114 (block J, 520). The broadcasting can be performed by a third-party node that is designated/chosen by the primary client device 108. As an illustrative example, the server system 102 can provide the primary client device 108 with a selection of third-party nodes from which the primary client device 108 can choose for broadcasting the signed transaction. In some implementations, the primary client device 108 can download the signed transaction and then broadcast the transaction on their own to the blockchain(s) 114. The broadcasting can be performed directly or indirectly by the HSM 104A.

As described throughout this disclosure, a cryptocurrency wallet operating on the HSMs 104A-N may not be a multi-signature wallet since only a single crypto private key is used by the HSMs 104A-N to sign transactions and that private key is not shared or otherwise distributed. The private key can be split up and secured by additional secrets that are associated with user accounts (e.g., the multiple signing client devices 112A-N). However, the concept of multiple signing client devices 112A-N confirming or authorizing before a proposed transaction can proceed, none of which may be controlled by the server system 102 itself, can be functionally similar with un-hosted multi-signature wallets, but with cryptographic security instead. Although the signing client devices 112A-N must validate each transaction request using their own credentials (e.g., username and password) and organizational x509 certificate, those signatures effectively can act as passcodes that are then used collectively to enable the crypto private key to be computed and then used to sign transactions. Accordingly, while the use of a sufficient number of signing client devices 112A-N credentials are a necessary condition to the HSMs 104A-N signing a transaction request, the signing client devices 112A-N are not themselves signing the transaction request using a wallet private key. Rather, the signing client devices 112A-N can provide their approval of the transaction request through cryptographic key technology that confirms they are indeed the signing client devices 112A-N with the authority to provide approval of the transaction request.

FIG. 6 is a conceptual diagram of the system 100 of FIG. 1 for generating private keys. The private keys can be generated and used by the primary client device 108 to request data or other information securely from multiple other parties. As described in reference to FIG. 1, the private keys can be generated for all the parties engaging in secure data sharing in the system 100. Refer to FIG. 1 and FIG. 2 for further discussion about generating a digital contract between parties engaging in secure data sharing.

The party at the primary client device 108 can generate user information in block A (600) using the software provided by the server system 102. Generating the user information can include creating a username and password for use with the software platform offered by the server system 102.

The user information can be transmitted to the server system 102 (block B, 602).

One or more of the software HSMs 111A-N of the server system 102 can generate a cryptographic key and organizational x509 certificate for the party of the primary client device 108 based on the user information in block C (604). The cryptographic key can include a public private key pair.

In block D (606), the one or more HSMs 111A-N can encrypt and store the user information. The encryption and storage can be done locally at the server system 102. For example, the party's username and password can be stored in encrypted form at the server system 102 in order to validate the party's access for certain account management functions with the software platform. Such encryption can prevent the server system 102 from viewing or accessing the party's password. The server system 102 may not store the cryptographic key and/or the organizational x509 certificate, in some implementations.

The party at the primary client device 108 can also initiate creation of a signing policy with a signing group and/or transaction authorization conditions (block E, 608). To initiate the creation of the signing policy, the party can provide user inputs to an automated web form developed and provided by the server system 102 in which the party can designate one or more parties in a signing group (e.g., signing parties) that will be asked for authorization/confirmation regarding transactions initiated by the primary client device 108. Such transactions can include, for example, transferring cryptocurrency from one or more cryptocurrency wallets created within the server system 102 and/or one or more wallets that are created in other networks outside of the server system 102. For the signing policy, the party can also designate a required number of authorizations that would be required to approve and execute such transactions that are requested by the primary client device 108.

In some implementations, the signing policy can specify a different required number of authorizations for transactions having different parameters. The parameters can include, but are not limited to, size (e.g., amount of currency being transacted), type of currency, parties involved, wallets involved, and other transaction conditions. For example, the party may designate a signing group of four parties: A, B, C, and D, and require that transactions in BITCOIN below 5 BTC require confirmation of two signing parties in the signing group to proceed, while transactions of 5 BTC or greater would require confirmations from all four signing parties in the signing group to proceed. The party at the primary client device 108 can also securely approve the created signing policy by signing a transaction using their cryptographic key and the organizational certificate (e.g., through providing their user information, such as username and password). As described further throughout this disclosure, the access control system 110, which determines if the requirements of the signing policy have been met with respect to any transaction to be made from the wallet associated with the primary client device 108, runs on the server system 102. However, the server system 102 cannot manually intervene in a transaction request, authorization, and validation process, and the access control system 110 simply cryptographically verifies the validity of the user information and threshold requirements set by the party at the primary client device 108.

The party can initiate the creation of several signing policies, each to govern different transactions. For example, the party can initiate generating a signing policy to be used by the access control system 110 to govern how a cryptocurrency transaction may be initiated from the software platform offered by the server system 102. The signing policy can cause creation of client-side cryptographic secret shares, which can be encoded data pieces that enable parties, such as the signing client devices 112A-N described herein, to perform joint computations without revealing information about underlying inputs. As a result, the server system 102 may not have access to the crypto private keys, such as the cryptographic key that is generated for the party of the primary client device 108 and/or a wallet associated with the primary client device 108.

The primary client device 108 transmits instructions for creating the signing policy to the MPC6 system 113, and more specifically one or more of the HSMs 115A-N of the MPC6 system 113, in block F-2 (612).

In block F-2 (612), the one or more HSMs 115A-N can generate the signing policy, additional corresponding cryptographic logic, and shards that correlate to the signing policies used by and in the access control system 110. The shards can be assigned to one or more of the signing client devices 112A-N. The cryptographic logic can include rules that the access control system 110 uses during runtime to validate a transaction request according to the transaction authorization conditions that the primary client device 108 established for the signing policy. The cryptographic logic can then be stored in a policy repository 620 (e.g., database, data store, cloud-based storage system, etc.) for runtime use by the access control system 110 (block F-3, 614).

FIG. 7 is a conceptual diagram of the system 100 of FIG. 1 for initiating transactions and obtaining approval or authorization by signing parties according to user-defined signing policies. Such transactions can include sending cryptocurrency from one wallet to another. Such transactions can also include sending other types of assets between different parties across networks, such as blockchains. Such transactions can also include secure data sharing, as described in reference to FIGS. 1-4.

Using a web portal 701, the primary client device 108 can initiate a transaction request in block A (700). In some implementations, another party designated to raise transactions, but not designated as a signing party, can perform block A (700) to send cryptocurrency from their wallet to another wallet. Initiating the transaction request can include providing user input at the primary client device 108 designating an amount of cryptocurrency to be sent and a recipient's pubic wallet address. Although FIG. 7 is described in reference to a cryptocurrency exchange or transaction, the disclosed techniques can also be applied to other scenarios. For example, as described in reference to FIGS. 1-4, the transaction can also include requesting data from one or more other parties.

The web portal 701 can be provided as part of the software platform of the server system 102. The web portal 701 can provide a web and/or mobile interface for the party at the primary client device 108 to manage their account, transactions, and/or wallets. The web portal 701 can also be provided to the signing client devices 112A-N to allow for the parties of these devices to perform actions with respect to their account, transactions, and/or wallets (such as authorizing the transaction request initiated by the primary client device 108).

The primary client device 108 can validate the transaction request based on the user information (e.g., their username and/or password) and organization certificate of the party associated with the primary client device 108 (block B, 702). Block B (702) can be performed using software that is provided by the server system 102 to the primary client device 108.

The primary client device 108 can transmit the encrypted transaction request upon validation to the server system 102 in block C (704). More particularly, the encrypted transaction request can be sent to the access control system 110. The encrypted transaction can include, in the illustrative example of at least FIG. 1, raw trade data to be used in execution of a machine learning model. The encrypted transaction can include, as another example of FIG. 1, the machine learning model.

In block D-1 (706), the access control system 110 can retrieve cryptographic logic associated with the signing policy for the primary client device 108 from the policy repository 620. In some implementations, the access control system 110 may already have the cryptographic logic locally accessible after the logic is generated by the server system 102, as described in reference to FIG. 6.

Then, in block D-2 (708), the access control system 110 can cryptographically verify that the transaction request parameters satisfy the cryptographic logic associated with the signing policy of the primary client device 108 (e.g., the party that initiated the transaction request in block A, 700). For example, the access control system 110 can apply the logic or other rules to data or other information in the transaction request, which can designate a required number of transaction authorizations/confirmations of the signing client devices 112A-N in the signing group 730.

Once the access control system 110 verifies that the parameters of the signing policy are met, the access control system 110 can transmit an automated request for transaction authorization to the signing client devices 112A-N that are designated as part of the signing group 730 according to the signing policy (block E, 710). In some implementations, there can be a time-to-live in which the access control system 110 waits for authorization from the signing client devices 112A-N. This time period can be predetermined. For example, the time period can be set by the server system 102. As another example, the time period can be set by the primary client device 108 in the associated signing policy. The time period can be an arbitrary time window, including but not limited to 1 minute, 3 minutes, 5 minutes, 10 minutes, 15 minutes, 30 minutes, 1 hour, etc. The time period can be adjustable by the primary client device 108, in some implementations. If the required number of signing client devices 112A-N does not authorize the transaction, then the transaction may be dropped and registered as a transaction signing failed event. Such information can be transmitted/relayed back to the primary client device 108, in some implementations.

One or more of the signing client devices 112A-N can authorize the transaction in block F (712) and transmit authorization results back to the access control system 110 (block G, 714). For example, each of the signing client devices 112A-N can receive an authorization/confirmation request notifying the relevant party of the transaction request initiated by the primary client device 108. The request can also present the party with the ability to authorize the transaction request using their respective credentials/user information (e.g., username and/or password) and organizational x509 certificate.

In some implementations, one or more of the signing client devices 112A-N may not authorize the transaction. If a required number of signing client devices 112A-N do not authorize the transaction, then the transaction may not be validated and thus the transaction may not be completed. If, on the other hand, the required number of signing client devices 112A-N authorize the transaction, then the transaction can be validated and completed.

Figure 8:
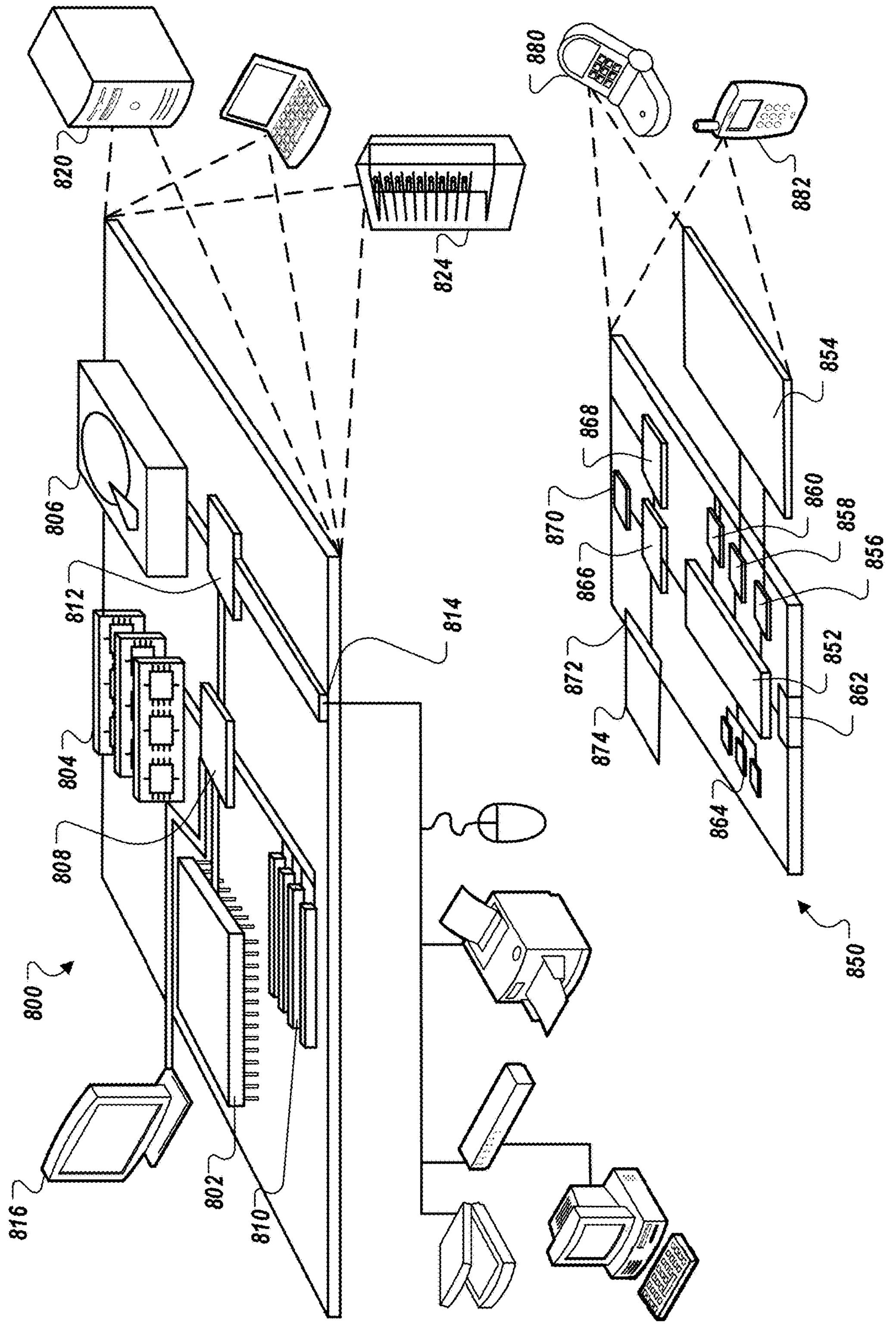
FIG. 8 is a schematic diagram that shows an example of a computing device and a mobile computing device.

FIG. 8 shows an example of a computing device 800 and an example of a mobile computing device that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 can also be another form of computer-readable medium, such as a magnetic or optical disk.

The storage device 806 is capable of providing mass storage for the computing device 800. In some implementations, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. In some implementations, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device (not shown), such as a mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication in some implementations, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. In some implementations, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for managing, authenticating, and authorizing data sharing between multiple parties utilizing multi-party-computation ("MPC") techniques, the method comprising:

receiving, by a server and from a party B system, (i) a request to access first data of a party A system and (ii) second data of the party B system, the first data comprising raw data and the second data comprising one or more machine learning models;

generating, by the server, an authorization request according to one or more signing policies defined by at least one of the party A system or the party B system;

transmitting, by the server and to the party A system and the party B system, the authorization request to authorize the request to access the first data;

receiving, by the server and from the party A system and the party B system, MPC shares associated with trusted third party processing of data from party A and party B, wherein the MPC shares were generated as part of a digital contract between party A and party B permitting for combining the first data and the second data within an environment of the trusted third party provided by the server, wherein neither party A nor party B have access to the environment of the trusted third party;

retrieving, by the server, one or more MPC authorization functions associated with the digital contract;

determining, by the server, whether the requested access to the first data and the second data is authorized based on the received MPC shares and the one or more MPC authorization functions associated with the digital contract;

performing, by the server and based on a determination that the requested access is authorized, data processing operations using the first data and the second data in a secure environment by (i) breaking up the first data into one or more raw data chunks and/or breaking up the second data into one or more machine learning model chunks and (ii) individually running one of the one or more machine learning model chunks with one of the one or more raw data chunks; and returning, by the server, output from the data processing operations, wherein the data processing operations are performed in a hardware security module (HSM) of the secure environment of the trusted third party associated with provided by the server where the party A system provides the first data and the party B system provides the second data without the first and second data being exposed to the other party system, wherein the data processing operations performed in the hardware security: module (HSM) of the secure environment are based on code that is authorized and audited by the party A system and the party B system to restrict information that is outputted from the secure environment, wherein the code that is authorized and audited by the party A system and the party B system allows party A and party B to respectively audit what data of the first data and second data is shared, how the first data and the second data is shared, and how the first data and the second data is used, and wherein the code that is authorized and audited by the party A system and the party B system allows party A and party B to respectively rescind access to the respective first data or the second data from party A or party B respectively.

2. The method of claim 1, wherein the MPC shares are rescinded when one of the party A system and the party B system opt not to provide the respective first data or the second data.

3. The method of claim 1, wherein the MPC authorization functions include a signing policy comprising (i) a designation of a transaction signing group, (ii) a designation of a plurality of transaction signing client devices that are included in the transaction signing group, and (iii) for each transaction class of a plurality of transaction classes, a corresponding threshold number of the plurality of transaction signing client devices that is required to authorize a transaction request, wherein the transaction request is a member of the transaction class.

4. The method of claim 3, wherein the transaction request comprises a request to process the first data using the second data, wherein the second data is a machine learning model.

5. The method of claim 1, wherein determining, by the server, whether the requested access to the first data and the second data is authorized based on the received MPC shares and the one or more MPC authorization functions associated with the digital contract comprises determining that a threshold quantity of users are required to provide permission for the data processing operations to execute.

6. The method of claim 5, wherein the threshold quantity of users comprises all users.

7. The method of claim 6, wherein all the users comprise the party A system and the party B system.

8. The method of claim 1, wherein the secure environment is an MPC system.

9. The method of claim 1, wherein the secure environment is a secure enclave of a trusted platform model ("TPM").

10. The method of claim 1, wherein the secure environment is a secure enclave of a hardware security module ("HSM").

11. The method of claim 1, wherein the authorization request comprises each of the party A system and the party B system signed shares of a cryptographic key associated with a digital contract between the party A system and the party B system.

12. The method of claim 1, wherein the first data is raw trade data and the second data is a machine learning model,
- wherein performing, by the server, processing operations using the first data and the second data in a secure environment comprises providing the raw trade data as input to the machine learning model to generate output, the output comprising secondary business data or commercial insights data.

13. The method of claim 1, wherein the processing operations are performed until at least one of the party A system and the party B system rescinds its respective first data or second data.

14. The method of claim 1, the method further comprising:
- creating, by the server system, a digital contract between the party A system and the party B system, wherein creating the digital contract comprises establishing an MPC group for sharing a cryptographic key and authenticating requests to access data between the party A system and the party B system;
- instructing, by the server, each of the party A system and the party B system to generate shares of the cryptographic key associated with the digital contract; and
- receiving, by the server and from each of the party A system and the party B system, respective shares of the cryptographic key.

15. The method of claim 14, wherein the creating, by the server system, a digital contract operation is performed before receiving, by a server and from a party B system, (i) a request to access first data of a party A system and (ii) second data of the party B system.

16. The method of claim 1, wherein performing, by the server, processing operations using the first data and the second data comprises:
- processing the first data into a plurality of data segments;
- processing the second data into a plurality of machine learning operations; and
- performing the processing operations for each of the plurality of machine learning operations, wherein each of the plurality of machine learning operations comprises a plurality of permission requests to access one or more of the plurality of data segments.

17. The method of claim 1, wherein the authorization request comprises signed payloads from each of the party A system and the party B system.

18. The method of claim 17, further comprising:
- encrypting, by the server, the first data with signatures from the signed payloads;
- transmitting the encrypted first data to a HSM, wherein the HSM is configured to perform the processing operations using the encrypted first data and the second data in a secure environment of the HSM; and
- receiving, by the server and from the HSM, the output from the processing operations.

19. A system for managing, authenticating, and authorizing data sharing between multiple parties utilizing multi-party-computation ("MPC") techniques, the system comprising:
- one or more processors; and
- memory storing instructions that, when executed, cause the one or more processors to perform operations comprising:
  - receive, from a party B system, (i) a request to access first data of a party A system and (ii) second data of the party B system, the first data comprising raw data and the second data comprising one or more machine learning models;
  - generate an authorization request according to one or more signing policies defined by at least one of the party A system or the party B system;
  - transmit, to the party A system and the party B system, the authorization request to authorize the request to access the first data;
  - receive, from the party A system and the party B system, MPC shares associated with trusted third party processing of data from party A and party B, wherein the MPC shares were generated as part of a digital contract between party A and party B permitting for combining the first data and the second data within an environment of the trusted third party provided by the server, wherein neither party A nor party B have access to the environment of the trusted third party;
  - retrieve one or more MPC authorization functions associated with the digital contract;
  - determine whether the requested access to the first data and the second data is authorized based on the received MPC shares and the one or more MPC authorization functions associated with the digital contract;
  - perform, based on a determination that the requested access is authorized, data processing operations using the first data and the second data in a secure environment by (i) breaking up the first data into one or more raw data chunks and/or breaking up the second data into one or more machine learning model chunks and (ii) individually running one of the one or more machine learning model chunks with one of the one or more raw data chunks; and return output from the data processing operations, wherein the data processing operations are performed in a hardware security module (HSM) of the secure environment of the trusted third party associated with provided by the server where the party A system provides the first data and the party B system provides the second data without the first and second data being exposed to the other party system, wherein the data processing operations performed in the hardware security module (HSM) of the secure environment are based on code that is authorized and audited by the party A system and the party B system to restrict information that is outputted from the secure environment, wherein the code that is authorized and audited by the party A system and the party B system allows party A and party B to respectively audit what data of the first data and second data is shared, how the first data and the second data is shared, and how the first data and the second data is used, and wherein the code that is authorized and audited by the party A system and the party B system allows party A and party B to respectively rescind access to the respective first data or the second data from party A or party B respectively.

20. The system of claim 19, wherein memory storing instructions that, when executed, further cause the one or more processors to rescind the MPC shares when one of the party A system and the party B system opt not to provide the respective first data or the second data.

* * * * *